3,058,923
POLYMERIZATION OF EPIHALOHYDRINS
Abraham Kutner, Newark, Del., assignor to Hercules Powder Company, Wilmington, Del., a corporation of Delaware
No Drawing. Filed July 1, 1960, Ser. No. 40,129
18 Claims. (Cl. 260—2)

This invention relates to a new process of polymerizing epihalohydrins and, more particularly, to an improved process of polymerizing epihalohydrins with a catalyst formed by mixing an alkylaluminum compound, a diol and tetrahydrofuran.

It has now been discovered that polymers of epihalohydrins having especially high molecular weights, and in particular amorphous polymers of epihalohydrins having especially high molecular weights, can be prepared by using a catalyst formed by mixing either a trialkylaluminum or a dialkylaluminum hydride, a hydrocarbon 1,3- or 1,4-diol and tetrahydrofuran.

Accordingly, the present invention relates to the process of polymerizing epihalohydrins which comprises contacting at least one epihalohydrin with a catalyst formed by mixing an alkylaluminum compound selected from the group consisting of trialkylaluminums and dialkylaluminum hydrides, a hydrocarbon diol, in which the hydroxyl groups are attached to two different carbon atoms that are separated by from 1 to 2 carbon atoms, in a molar ratio of about 1:0.1 to about 1:0.8, and tetrahydrofuran.

Before discussing the invention in greater detail, the following examples are presented for purposes of illustration, parts and percentages being by weight unless otherwise specified. The molecular weight of the polymers in the examples is indicated by the reduced specific viscosity (RSV) given therein. By the term "reduced specific viscosity" is meant the specific viscosity divided by the concentration of solution in grams per 100 ml. at 100° C. on a solution in $\alpha$-chloronaphthalene containing 0.1 gram of the polymer in 100 ml. of solution.

Example 1

A triisobutylaluminum - butane - 1,4 - diol solution, 0.5 molar with respect to aluminum, was prepared under nitrogen in 100 parts of n-heptane in a closed vessel by mixing 31.7 parts of triisobutylaluminum with sufficient butane-1,4-diol to give a triisobutylaluminum to butane-1,4-diol molar ratio of 1:0.4 and agitating for 2 hours at room temperature with intermittent venting to avoid a build-up of excessive pressure.

A polymerization vessel was charged, under an atmosphere of nitrogen, with 36.5 parts of toluene, 1.06 parts of tetrahydrofuran and 10 parts of epichlorohydrin. Then with agitation an amount of the triisobutylaluminum butane 1,4-diol solution was added to give a tetrahydrofuran to triisobutylaluminum molar ratio of 3.7:1. The reaction mixture was agitated at 30° C. for 19 hours after which 4 parts of ethanol was added to stop the reaction. The vessel was vented, 78.9 parts of ethanol added to precipitate the polymer and the supernatant liquor decanted. Another 78.9 parts of ethanol was added and the entire mixture agitated vigorously to improve the physical form of the polymer. The polymer was filtered and then suspended in 53 parts of diethyl ether, filtered and suspended in 79 parts of 1% HCl in methanol, filtered and washed with methanol, and finally covered with a 0.2% solution of 4,4'-thiobis(6-tert-butyl-m-cresol) in ethanol. After an hour the ethanol solution was drained and the polymer dried overnight in a vacuum oven at 60° C. Poly(epichlorohydrin) having an RSV of 15.1 was isolated in 99% conversion.

A determination of the amorphous content of the polymer was obtained as follows: From a sample of the polymer a 1% suspension in acetone was prepared and agitated overnight at 25° C. Ninety percent of the sample dissolved, indicating that at least 90% of the polymer was amorphous. That the acetone-soluble portion of the polymer was amorphous was confirmed by X-ray and by the absence of the characteristic absorption of crystalline poly(epichlorohydrin) (1896$\mu$) in the infrared. From the above it can be seen that the poly(epichlorohydrin) was essentially wholly amorphous.

A film cast from an acetone solution of this polymer was strong and elastic. Although stretching of the film resulted in considerable orientation, no development of crystallinity was observed by X-ray of the film in the stretched condition.

Example 2

Epichlorohydrin was polymerized and isolated as described in Example 1 using ¼ the amount of triisobutylaluminum-butane-1,4-diol solution used in Example 1. Therefore, the molar ratio of tetrahydrofuran to triisobutylaluminum in the catalyst was 14.8:1. Conversion to a poly(epichlorophydrin) having an RSV of 8.2 was quantitative. This polymer was also found to be essentially wholly amorphous.

Example 3

Two catalysts, designated A and B for purposes of identification, were prepared under nitrogen in n-heptane solution in a closed vessel by mixing triisobutylaluminum with butane-1,4-diol in the molar ratio of 1:0.4. Tetrahydrofuran was added to a portion of the resulting solution in sufficient amount to form catalyst A containing tetrahydrofuran and triisobutylaluminum in a molar ratio of 1:1. Catalyst B was prepared with half the amount of tetrahydrofuran used to prepare catalyst A and, therefore, contained tetrahydrofuran and triisobutylaluminum in molar ratio of 0.5:1.

Two polymerizations of epichlorohydrin were conducted using catalysts A and B following the general procedure described in Example 1. Using catalyst A amorphous poly(epichlorophydrin) having an RSV of 9.1 was produced in 97% conversion. Using catalyst B amorphous poly(epichlorophydrin) having an RSV of 11.7 was produced in 47% conversion. In each case the polymer was isolated as described in Example 1.

Example 4

A triethylaluminum-butane - 1,4 - diol - tetrahydrofuran catalyst was prepared as described in Example 1 by substituting triethylaluminum for triisobutylaluminum. Epichlorohydrin was polymerized as described in Example 1 using this catalyst. The poly(epichlorohydrin) isolated as described in Example 1 had an RSV of 7.0. Conversion was 47.5%. The solubility of the polymer in acetone indicated that it was approximately 50% crystalline polymer.

Example 5

A triisobutylaluminum-propane-1,3,-diol-tetrahydrofuran catalyst was prepared as described in Example 1 by substituting propane-1,3-diol for butane-1,4-diol. Epichlorohydrin was polymerized as described in Example 1 using this catalyst. Poly(epichlorohydrin) having an RSV of 11.9 was isolated as described above in 55% conversion. The solubility of the polymer in acetone indicated that it was approximately 50% crystalline polymer.

Example 6

A triisobutylaluminum-2-butene-1,4-diol-tetrahydrofuran catalyst was prepared as discussed in Example 1 by substituting 2-butene-1,4-diol for butane-1,4-diol. Epichlorohydrin was polymerized as described above using this catalyst. Poly(epichlorohydrin) having an RSV of 9.1 was isolated as disclosed above in a 67% conversion. The solubility of the polymer in acetone indicated that it was predominantly amorphous (less than 7% crystalline polymer).

*Example 7*

A polymerization of epichlorohydrin was conducted following the same general conditions described in Example 1, except the reaction was conducted in heptane instead of toluene. The catalyst used in the polymerization was triisobutylaluminumbutane-1,4-diol-tetrahydrofuran, the components being in the molar ratio of 1:0.4:3.5, respectively. Poly(epichlorohydrin) having an RSV of 8.1 was isolated as described in Example 1 in 93% conversion. The solubility of the polymer in acetone indicated that it was essentially wholly amorphous.

*Example 8*

A polymerization vessel was charged, under an atmosphere of nitrogen with 69.4 parts of toluene, 0.84 part of tetrahydrofuran and 8.0 parts of epichlorohydrin. Then with agitation, freshly prepared triisobutylaluminum-butane-1,4-diol was added in an amount equivalent to 4 mmoles (based on the triisobutylaluminum) per 10 grams of epichlorohydrin. The molar ratio of triisobutylaluminum to butane-1,4-diol was 1:0.4. The temperature of the reaction was maintained at 54° C. for 4 hours after which the poly(epichlorohydrin) was precipitated by the addition of 12 parts of n-heptane. Then 0.5 part of ethyl alcohol was added to destroy any residual catalyst. The polymer was isolated as described in Example 1. Poly(epichlorohydrin) having an RSV of 6.2 was produced in 94% conversion. The solubility of the polymer in actone indicated that it was predominantly amorphous.

The polymerization of epihalohydrins in accordance with this invention is carried out by contacting an epihalohydrin or mixture of epihalohydrins preferably in an inert liquid organic diluent with a catalyst formed by mixing either a triaalkylaluminum or dialkylaluminum hydride with a hydrocarbon diol, in which the hydroxyl groups are attached to two different carbon atoms that are separated by from 1 to 2 carbon atoms, in a molar ratio of from about 1:0.1 to about 1:0.8, and preferably from about 1:0.3 to about 1:0.5, and tetrahydrofuran.

Any epihalohydrin such as epichlorohydrin, epibromohydrin, epifluorohydrin or epiiodohydrin can be homopolymerized or copolymerized with each other by the process of the invention to prepare high molecular weight polymers having an RSV of at least 5.0.

Any trialkylaluminum or dialkylaluminum hydride can be used in the preparation of the catalyst. Exemplary trialkylaluminums and dialkylaluminum hydrides are: trimethylaluminum, triethylaluminum, triisobutylaluminum, diisobutyl ethylaluminum, triisopropylaluminum, trioctylaluminum, diisobutylaluminum hydride, etc.

As stated above, the diol component of the catalyst can be any hydrocarbon diol in which the hydroxyl groups are attached to two different carbon atoms that are separated by from 1 to 2 carbon atoms. Exemplarly diols are: butane-1,4-diol, 2-butene-1,4-diol, cis-cyclohexane-1,4-diol, trans-cyclohexane-1,4-diol, propane-1,3-diol, etc. The most preferred diol component is butane-1,4-diol.

Tetrahydrofuran is unique in its beneficial action as the third component of the catalyst. Other compounds such as diethyl ether, dioxane, dioxolane, N-methyl morpholine, tetrahydropyran, bis(chloromethyl)oxetane, tetrahydrothiophene and N-methyl pyrrolidine when used in the manner tetrahydrofuran is used in this invention, have little or no effect on the catalyst activity.

Catalysts comprising any of the different combinations of components within the scope of the foregoing disclosure are efficient in producing high molecular weight polymers by the process of this invention. However, the combination of triisobutylaluminum, butane-1,4-diol, and tetrahydrofuran is outstanding in producing high yields of essentially wholly amorphous polymer having especially high molecular weight.

The catalyst of this invention is readily formed by mixing the alkylaluminum compound, hydrocarbon diol and tetrahydrofuran at a temperature of from about −30° C. to about 100° C., preferably from about 0° C. to about 30° C., in an inert liquid organic diluent as, for example, aliphatic hydrocarbons such as hexane, heptane, octane, etc., cycloaliphatic hydrocarbons such as cyclohexane, etc., or aromatic compounds such as benzene, toluene, chlorobenzene, cumene, p-cymene, etc., or mixtures of these diluents. The order of addition of the three components to the inert diluent is immaterial. Furthermore, the catalyst can be preformed, i.e. formed before the polymerization reaction is commenced, or it can be formed in situ, i.e. in the presence of the epihalohydrin under polymerization conditions.

The molar ratio of alkylaluminum compound to hydrocarbon diol is well defined; good results are achieved when the ratio is from about 1:0.1 to about 1:0.8 and optimum results when it is from about 1:0.3 to about 1:0.5. On the other hand, the molar ratio of tetrahydrofuran to aluminum is widely variable. Any molar ratio from about 0.5:1, more preferably 1:1, to about 15:1 is satisfactory.

The actual catalyst is most probably a reaction product of the alkylaluminum compound and hydrocarbon diol complexed with the tetrahydrofuran, but the exact composition and structure of the catalyst are not known.

Excellent catalysts can be prepared in an alternate way by reaction of, for instance, butane-1,4-diol and aluminum isopropoxide and then combining the product with the alkylaluminum compound (in which case a lesser amount of this ingredient is required than when starting with the diol itself) and tetrahydrofuran.

The catalyst can be added to the polymerization by any of the methods known to the prior art. However, it is preferred to add the catalyst rapidly and obtain the desired concentration within a few minutes of the start of polymerization. The addition of catalyst over a longer period of time seems to adversely affect the percent conversion of monomer.

As stated above, the polymerization in accordance with this invention is preferably carried out in an inert liquid organic diluent but can be carried out in the bulk without a diluent. Suitable inert diluents are those previously mentioned as useful in the preparation of the catalyst.

The polymerization process can be carried out in a wide variety of ways as, for example, either as a batch or continuous operation. In general, the polymerization will be carried out at from about room temperature to about 60° C. but any temperature within the range of from about −30° C. to about 150° C. can be used. In the same way, while atmospheric pressure or a pressure of only a few pounds can be used, the polymerization can be carried out over a wide range of pressures as, for example, from a partial vacuum to 1,000 pounds. The catalyst can be used in the ratio of from about 2 to about 100 and preferably from about 20 to about 35 mmoles (based on the aluminum) mole of epihalohydrin monomer or monomers.

The polymers produced by the process of this invention can be essentially wholly amorphous or they can be a mixture of the amorphous and crystalline polymer depending primarily on the catalyst composition used. For example, the preferred triisobutylaluminum-butane-1,4-diol-tetrahydrofuran catalyst produces essentially amorphous polymers. The copolymerization of one epihalohydrin with another epihalohydrin will, of course, favor the production of amorphous copolymers irrespective of the catalyst used.

As shown by the above examples and discussion, the use of the three component catalyst of this invention has many advantages over the use of the prior art catalysts.

In particular, especially by using the preferred catalyst, very high molecular weight amorphous polymers can be obtained which have an exceptional strength in the unvulcanized state not exhibited by lower molecular weight amorphous polymers. Both the amorphous and mixed amorphous-crystalline forms of the polymers possess a variety of uses. The amorphous polymers are rubbery and can be used in foamed rubber compositions, in the preparation of rubber bands, as adhesive components, as polymeric plasticizers and in the preparation of elastomeric fiber. When the amorphous polymers are cross-linked, they can be used, for instance, as specialty rubbers where their high resistance to organic solvents makes them valuable in preparing hydraulic seals, fuel pump diaphragms, gasoline tanks, oil valve seats, belting, etc. The mixed amorphous and crystalline polymers are more or less plastic and can be injection molded, extruded, or compression molded and can, for instance, be used either cross-linked or not as oriented fiber in tire cord, textile fibers, in resin reinforcement in nonwoven fabrics, in rope, etc.

Cross-linking of the polymers to achieve optimum durability and high solvent resistance can be achieved by heating in the presence of one or more cross-linking agents. Examples of suitable cross-linking agents are: ethylenediamine, p-phenylenediamine, hexamethylenediamine carbamate, tri-n-butylamine-sulfur-2-mercaptobenzothiazole, poly(2-methyl-5-vinyl-pyridine)-tetramethylthiuram disulfide, disproportionated rosin amine-zinc dimethyldithiocarbamate, etc. The optimum amount of each cross-linking agent and the optimum conditions can be readily determined for any given copolymer.

What I claim and desire to protect by Letters Patent is:

1. The process of polymerizing epilhalohydrins which comprises compacting at least one epihalohydrin with a catalyst formed by mixing an alkylaluminum compound selected from the group consisting of trialkylaluminums and dialkylaluminum hydrides, a hydrocarbon diol containing from 3 to 6 carbon atoms, in which the hydroxyl groups are attached to two different carbon atoms that are separated by from 1 to 2 carbon atoms, in a molar ratio of alkylaluminum compound to hydrocarbon diol of from about 1:01 to about 1:0.8, and tetrahydrofuran, the molar ratio of tetrahydrofuran to alkylaluminum compound being within the range of from about 0.5:1 to about 15:1.

2. The process of claim 1 wherein an epihalohydrin is homopolymerized.

3. The process of claim 2 wherein the epihalohydrin is epichlorohydrin.

4. The process of claim 1 wherein two epihalohydrins are copolymerized.

5. The process of claim 1 wherein the alkylaluminum compound is a trialkylaluminum.

6. The process of claim 5 wherein the trialkylaluminum is triethylaluminum.

7. The process of claim 5 wherein the trialkylaluminum is triisobutylaluminum.

8. The process of claim 1 wherein the molar ratio of alkylaluminum compound to dihydric alcohol is 1:0.4.

9. The process of claim 1 wherein the dihydric alcohol is butane-1,4-diol.

10. The process of claim 1 wherein the dihydric alcohol is 2-butene-1,4-diol.

11. The process of claim 1 wherein the dihydric alcohol is propane-1,3-diol.

12. A process of claim 1 wherein the catalyst is preformed and then added to the polymerization.

13. The process of claim 1 wherein the catalyst is formed in situ.

14. The process of claim 1 conducted in an inert liquid organic diluent.

15. The process of claim 14 wherein the diluent is toluene.

16. The process of claim 14 wherein the diluent is n-heptane.

17. The process of polymerizing epichlorohydrin which comprises contacting epichlorohydrin with a catalyst formed by mixing triisobutylaluminum and butane-1,4-diol in a molar ratio of trisobutylaluminum to butane-1,4-diol of from about 1:0.1 to about 1:0.8, and tetrahydrofuran, the molar ratio of tetrahydrofuran to triisobutylaluminum being within the range of from about 0.5:1 to about 15:1.

18. The process of claim 17 wherein the molar ratio of triisobutylaluminum to butane-1,4-diol is 1:0.4.

References Cited in the file of this patent

UNITED STATES PATENTS

| | | |
|---|---|---|
| 2,844,545 | Borkovec | July 22, 1958 |
| 2,870,100 | Stewart et al. | Jan. 20, 1959 |
| 2,871,219 | Baggett et al. | Jan. 27, 1959 |
| 2,882,264 | Barnes | Apr. 14, 1959 |

FOREIGN PATENTS

| | | |
|---|---|---|
| 793,065 | Great Britain | Apr. 9, 1958 |
| 804,982 | Great Britain | Nov. 26, 1958 |

OTHER REFERENCES

Hsieh et al.: J. Polym. Sci. 26 (November 1957), pages 240–2.

UNITED STATES PATENT OFFICE
CERTIFICATE OF CORRECTION

October 16, 1962

Patent No. 3,058,923

Abraham Kutner

It is hereby certified that error appears in the above numbered patent requiring correction and that the said Letters Patent should read as corrected below.

Column 2, line 37, for "continued" read -- contained --; column 4, line 61, after the closing parenthesis insert -- per --; column 5, line 36, for "compacting" read -- contacting --.

Signed and sealed this 19th day of March 1963.

(SEAL)
Attest:

ESTON G. JOHNSON
Attesting Officer

DAVID L. LADD
Commissioner of Patents